(12) United States Patent
Garty et al.

(10) Patent No.: US 11,908,466 B2
(45) Date of Patent: Feb. 20, 2024

(54) AUTOMATICALLY DETERMINING A DESCRIPTIVE IDENTIFIER FOR A PROCESS GROUPING

(71) Applicant: ServiceNow, Inc., Santa Clara, CA (US)

(72) Inventors: Asaf Garty, Sdei Hemed (IL); Robert Bitterfeld, Petah Tikva (IL)

(73) Assignee: ServiceNow, Inc., Santa Clara, CA (US)

(*) Notice: Subject to any disclaimer, the term of this patent is extended or adjusted under 35 U.S.C. 154(b) by 267 days.

(21) Appl. No.: 16/896,900

(22) Filed: Jun. 9, 2020

(65) Prior Publication Data
US 2021/0383801 A1 Dec. 9, 2021

(51) Int. Cl.
| | |
|---|---|
| *G06F 3/16* | (2006.01) |
| *G06F 40/284* | (2020.01) |
| *G06F 40/242* | (2020.01) |
| *G10L 15/22* | (2006.01) |
| *G10L 15/26* | (2006.01) |
| *G10L 15/30* | (2013.01) |

(52) U.S. Cl.
CPC .............. *G10L 15/22* (2013.01); *G06F 3/167* (2013.01); *G06F 40/284* (2020.01); *G10L 15/26* (2013.01); *G10L 15/30* (2013.01); *G06F 40/242* (2020.01); *G10L 2015/223* (2013.01)

(58) Field of Classification Search
CPC ......... G10L 15/00; G10L 15/22; G10L 15/26; G10L 15/30; G10L 2015/223; G06F 40/00; G06F 40/242; G06F 40/284; G06F 3/00; G06F 3/167; G06F 8/00; G06F 8/30
See application file for complete search history.

(56) References Cited

U.S. PATENT DOCUMENTS

| | | | |
|---|---|---|---|
| 8,635,204 B1* | 1/2014 | Xie | G06F 8/71 |
| | | | 707/E17.075 |
| 9,419,996 B2* | 8/2016 | Porat | G06F 21/566 |
| 10,419,469 B1* | 9/2019 | Singh | G06F 16/9024 |
| 2013/0275433 A1* | 10/2013 | Shibata | G06F 16/93 |
| | | | 707/740 |
| 2017/0060842 A1* | 3/2017 | Dwarakanath | G06F 40/289 |
| 2017/0102925 A1* | 4/2017 | Ali | G06F 8/30 |
| 2017/0251003 A1* | 8/2017 | Rostami-Hesarsorkh | |
| | | | G06N 5/01 |
| 2019/0129701 A1* | 5/2019 | Hawrylo | G06F 8/60 |
| 2019/0324731 A1* | 10/2019 | Zhou | G06N 5/003 |
| 2020/0314117 A1* | 10/2020 | Nguyen | G06F 21/552 |
| 2021/0019476 A1* | 1/2021 | Roche | G06F 40/211 |

\* cited by examiner

*Primary Examiner* — Daniel C Washburn
*Assistant Examiner* — Sean E Serraguard
(74) *Attorney, Agent, or Firm* — Van Pelt, Yi & James LLP

(57) ABSTRACT

One or more parameters of one or more processes identified as belonging to a specific process grouping among a plurality of process groupings are obtained. Eligible token words in the one or more parameters are identified. The eligible token words are processed to select a subset within the eligible token words that are likely descriptive of the specific process grouping. The selected subset within the eligible token words is utilized to determine a descriptive identifier associated with the specific process grouping.

20 Claims, 5 Drawing Sheets

AUTOMATICALLY DETERMINING A DESCRIPTIVE IDENTIFIER FOR A PROCESS GROUPING

BACKGROUND OF THE INVENTION

A software process (or process for short) is an instance of a computer program that is being executed by electronic circuitry of a computer, such as a central processing unit. The computer program associated with the process is a collection of instructions while the process is the execution of those instructions. Several processes may be associated with the same computer program (also referred to as an application). In fact, in many scenarios, particularly in data center computing environments, there may be tens or hundreds of processes associated with an application. In various scenarios, it is difficult to identify a true application behind countless processes, e.g., because process names are often not sufficiently descriptive. Thus, it would be beneficial to develop techniques directed toward improving identification of applications to which processes belong.

BRIEF DESCRIPTION OF THE DRAWINGS

Various embodiments of the invention are disclosed in the following detailed description and the accompanying drawings.

DETAILED DESCRIPTION

Figure 1:
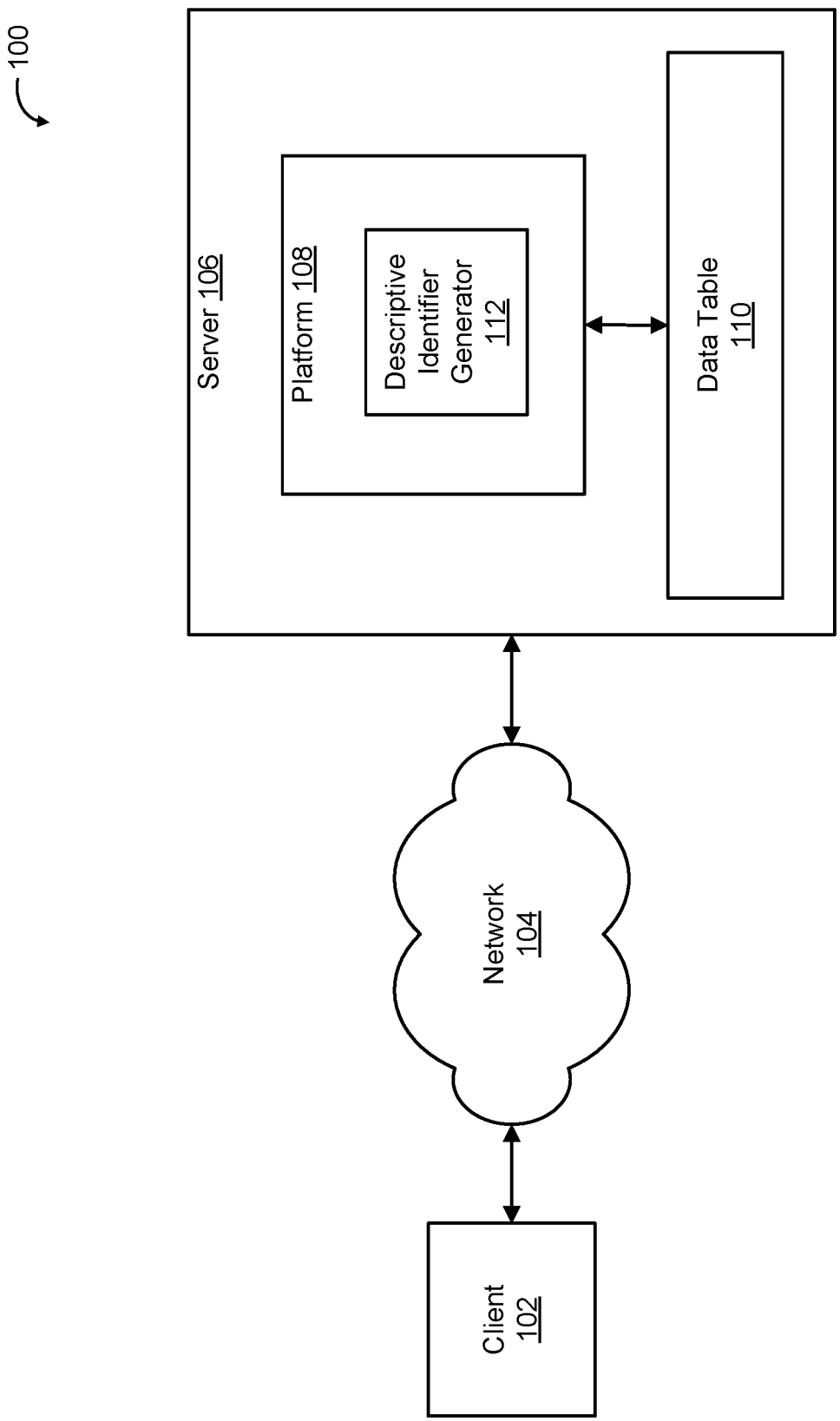
FIG. 1 is a block diagram illustrating an embodiment of a system for determining a descriptive identifier for a software process grouping.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatically determining a descriptive identifier for a software process grouping (also referred to herein as a process grouping, process group, etc.) is disclosed. One or more parameters of one or more processes identified as belonging to a specific process grouping among a plurality of process groupings are obtained. Eligible token words in the one or more parameters are identified. The eligible token words are processed to select a subset within the eligible token words that are likely descriptive of the specific process grouping. The selected subset within the eligible token words is utilized to determine a descriptive identifier associated with the specific process grouping.

A technological and practical benefit of the techniques disclosed herein is improvement of information technology operations management (ITOM) technology. An important aspect of ITOM is discovery of information technology (IT) assets that exist in a specific user environment. ITOM discovery is necessary in order to determine which IT assets need to be managed. An unsolved problem in ITOM discovery is identifying applications in a user environment (e.g., business software applications in a data center). Identifying applications is challenging because applications comprise many software processes that include countless process parameters and information. Configuration management database (CMDB) technology is improved by utilizing the techniques disclosed herein to more accurately and efficiently store information about software assets. A CMDB may be populated with configuration items (e.g., names of identified applications) to indicate which applications exist within a specific user environment.

One reason it is difficult to identify a true application behind countless processes is that process names are often not sufficiently descriptive. For example, many processes have "java" as the process name. Furthermore, examining a few process parameters that follow the process name is oftentimes not helpful because many processes have numerous Java-related or similarly non-differentiating parameters that follow the process name. Stated alternatively, many process parameters are common to various processes. Various prior approaches to the problem of ITOM discovery involve specifying particular rules for identifying particular applications, e.g., a rule identifying SAP as an application if the word "SAP" and/or other words are found. However, such an approach is cumbersome, may not be accurate, could require thousands of rules, and still fail to be comprehensive as new technologies and applications are deployed. An advantage of the techniques disclosed herein is that they are systematic and automated. The techniques disclosed herein allow for automatically identifying applications in a manner that is consistent and scalable.

In various embodiments, software processes are grouped based on one or more attributes such that each process grouping likely corresponds to one software application. In some embodiments, a clustering algorithm is utilized to group all running processes in a user environment (e.g., a data center). In various embodiments, after process groupings are created, process parameters are analyzed to determine descriptive identifiers for the process groupings. Process parameters specify configuration information used by processes. Specific examples of process parameters are provided below (e.g., see description associated with FIG. 2). As used herein, parameters also refer to, in a general sense, descriptive information associated with software processes that can be analyzed to determine descriptive identifiers for process groupings (e.g., names of applications). As used herein, parameters include process parameters (as described above), process names, process command lines, and process paths. Process command lines are text utilized to start processes. Process paths specify locations (e.g., a directory in a file system) in which files that start processes are found.

In various embodiments, parameters associated with a process grouping are broken down into a set of token words to be processed to determine a descriptive identifier for the process grouping. Processing to determine the descriptive identifier can include filtering out backlisted keywords, normalizing the token words (e.g., removing special characters and/or numbers, converting uppercase to lowercase, etc.), filtering out high frequency keywords that are considered non-differentiating (e.g., based on a term frequency-inverse document frequency (TD-IDF) or similar approach), and stemming token words. In some embodiments, several top keywords (e.g., three top keywords ordered by frequency score) are utilized to form a suggested process grouping name. In many scenarios, the suggested process grouping name can be adopted by a user as a true application name. In various embodiments, the user is able to refine/modify the suggested process grouping name.

FIG. 1 is a block diagram illustrating an embodiment of a system for determining a descriptive identifier for a software process grouping. In the example shown, system 100 includes client 102, network 104, and server 106. In various embodiments, client 102 is a computer or other hardware device that a user utilizes to interact with server 106. Examples of a client hardware device include: a desktop computer, a laptop computer, a tablet, a smartphone, or any other device. In various embodiments, the client hardware device includes a software user interface through which the user interacts with server 106. In various embodiments, the software user interface is utilized to determine descriptive identifiers for process groupings.

In the example illustrated, client 102 is communicatively connected to network 104. Requests are transmitted to and responses received from server 106 via network 104. Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 106 is a computer or other hardware component that stores a platform that includes process grouping identification functionality.

In the example shown, platform 108 runs on server 106. In some embodiments, platform 108 is an instance of a platform as a service (PaaS). In various embodiments, platform 108 includes a collection of programs or pieces of software (not shown in FIG. 1) designed and written to fulfill various particular purposes (e.g., information technology, human resources, cybersecurity, and/or other purposes). Platform 108 is communicatively connected to data table 110 and causes data to be read from and/or stored in data table 110. Data table 110 is a structured and organized collection of data stored on server 106. It is also possible for data table 110 to be located at least in part on a server separate from but communicatively connected to server 106.

In some embodiments, a software user interface of client 102 controls platform 108 to populate a CMDB with information associated with software assets. For example, the software assets can be applications (comprised of various software processes) running on server 106 or a separate computer system (not shown in FIG. 1) communicatively connected via network 104. In various embodiments, the various software processes have been clustered into groups corresponding to software applications. In some embodiments, descriptive information associated with the software processes are stored in data table 110. Examples of descriptive information include process command lines, process parameters, process names, and process paths. This descriptive information is also referred to herein generally as parameters. Client 102 may instruct platform 108 to analyze the descriptive information associated with the software processes to determine a descriptive identifier for each clustered group of processes (corresponding to an application) to store in the CMDB.

In the example shown, platform 108 includes descriptive identifier generator 112 as a software component of platform 108. In various embodiments, for each process grouping's set of descriptive information (e.g., process parameters, process command lines, process names, and process paths) stored in data table 110, descriptive identifier generator 112 automatically generates a corresponding descriptive identifier for that process grouping. Process groupings are formed before descriptive identifiers for the process grouping are generated. Process groupings can be formed by utilizing various approaches. For example, processes can be clustered based on various process-related attributes and information. Such attributes and information can include process parameters, process command lines, and process names. When performing clustering to determine process groupings, process (file) paths are typically not utilized in order to produce better clustering results and allow for grouping of similar applications that are installed in different locations. However, when generating descriptive identifiers, in various embodiments, file paths are taken into account because they have a high potential to include true application names. In some embodiments, software processes are clustered using density-based spatial clustering of applications with noise (DBSCAN). Other clustering approaches that may be used include K-means clustering, mean-shift clustering, expectation-minimization clustering using gaussian mixture models, agglomerative hierarchical clustering, and various other approaches known in the art.

After process groupings have been created, descriptive identifier generator 112 generates a descriptive identifier for each process grouping based on parameters (descriptive information) associated with that process group (e.g., process parameters, process command lines, process names, and process paths). In various embodiments, descriptive identifier generator 112 decomposes the parameters (descriptive information) associated with a process grouping into a set of token words to be further processed. In various embodiments, the token words are normalized, which, as described in further detail herein, can include converting token word letters to lowercase, removing numbers, and removing special characters (e.g., non-alphabetic characters). In various embodiments, as described in further detail herein, token words are filtered to remove high frequency words that do not aid in differentiating process groupings. In various embodiments, as described in further detail herein, token words are stemmed (e.g., converted to a root form). In some embodiments, a list of most common/frequent processed token words for each process group (e.g., a list of ten token words) is presented to a user to help the user identify an application corresponding to the process group. The user may create an application name (e.g., of an enterprise application) based on the list of token words. The application name can correspond to a configuration item with which to populate a CMDB.

In various embodiments, descriptive identifier generator 112 determines a descriptive identifier associated with a specific process grouping from the processed token words for the specific process grouping. In some embodiments, a small group of processed token words are selected (e.g., three most common/frequent processed token words in the specific process grouping) to form a suggested process grouping name. In many scenarios, the suggested process grouping name can be adopted by a user as a true application name. In various embodiments, the user is able to modify/refine the suggested process grouping name.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients that connect to server 106 may exist. The number of components and the connections shown in FIG. 1 are merely illustrative. Components not shown in FIG. 1 may also exist.

Figure 2:
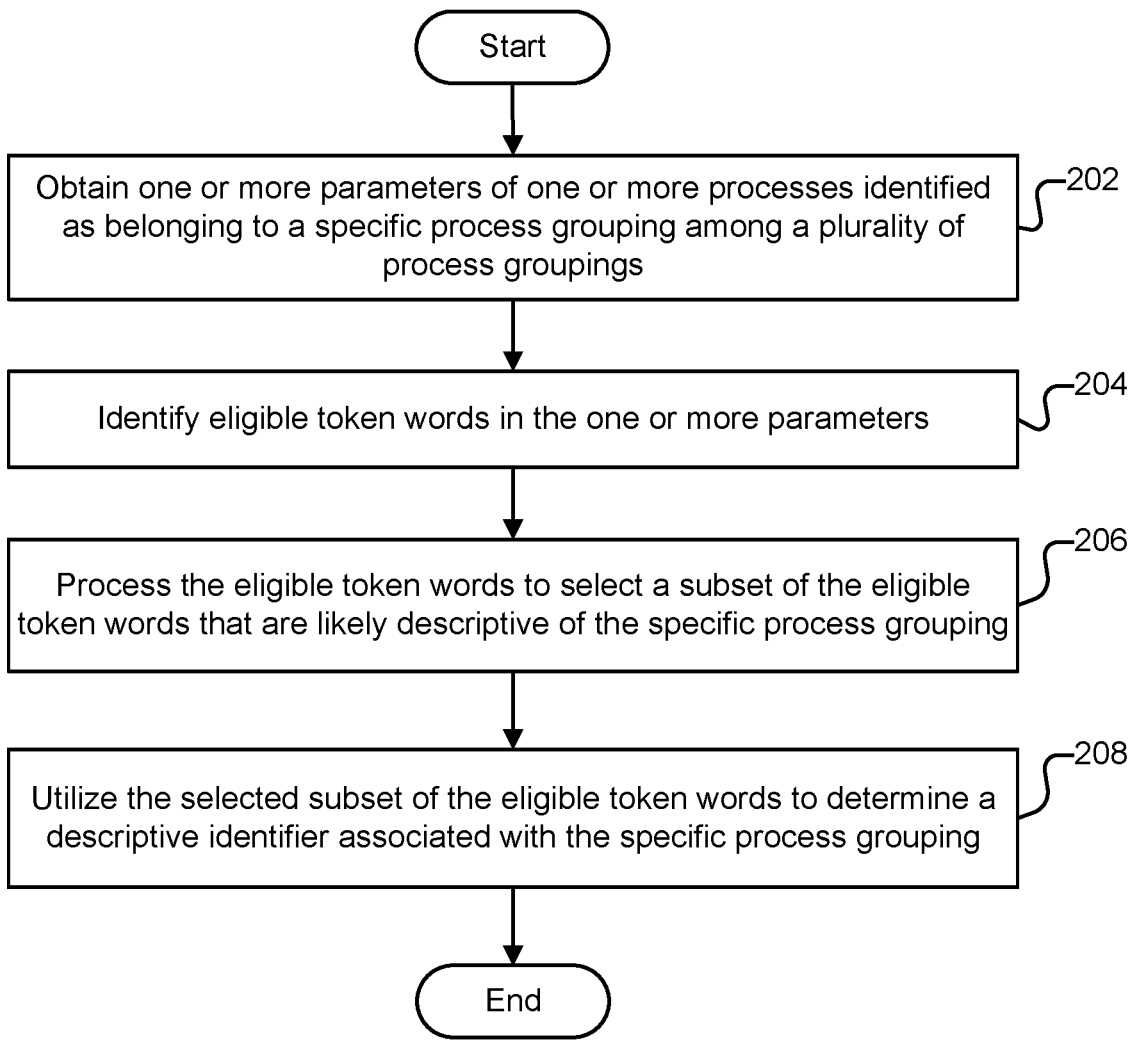
FIG. 2 is a flow chart illustrating an embodiment of a process for determining a descriptive identifier for a software process grouping.

FIG. 2 is a flow chart illustrating an embodiment of a process for determining a descriptive identifier for a software process grouping. In some embodiments, the process of FIG. 2 is performed by descriptive identifier generator 112 of platform 108 of FIG. 1.

At 202, one or more parameters of one or more processes identified as belonging to a specific process grouping among a plurality of process groupings are obtained. In various embodiments, the specific process grouping and the plurality of process groupings have been formed using a clustering approach. In some embodiments, the parameters are stored in data table 110 of FIG. 1 or another data storage location. Examples of parameters include process command lines, process parameters, process names, and process paths. Process paths can be informative because in many scenarios a user has installed an application in a file system directory that has a path that includes the application's name. Stated alternatively, the application's name may be in the path of an executable for the application, which means the path can include highly descriptive information. In some embodiments, a CMDB is populated with processes that are running and the CMDB includes the parameters described above. In some embodiments, data table 110 of FIG. 1 is part of the CMDB. In various embodiments, the obtained parameters are process command lines, process parameters, process names, process paths, etc. of all the processes in the specific process grouping combined together. Shown below is an example portion of obtained parameters for one process.

"C:\Program Files\Java\jdk1.8.0_77\bin\java"-D[Server: server-one]-XX:PermSize=256m-XX: MaxPermSize=256m-Xms64m-Xmx512m-server- Djava.net.preferIPv4Stack=true-Djboss.home.dir=C: \wildfly-8.0.0.Final(1)\wildfly-8.0.0.Final- Djboss.modules.system.pkgs=org.jboss.byteman- Djboss.serverlog.dir=C:\wildfly-8.0.0.Final(1)\wildfly-8.0.0.Final\domain\servers\server-one\log- Djboss.server.temp.dir=C:\wildfly-8.0.0.Final(1)\wildfly-8.0.0.Final\domain\servers\server-one\tmp- Djboss.server.data.dir=C:\wildfly-8.0.0.Final(1)\wildfly-8.0.0.Final\domain\servers\server-one\data- Dorg.jboss.boot.log.file=C:\wildfly-8.0.0.Final(1)\wildfly-8.0.0.Final\domain\servers\server-one\log\server.log- Dlogging.configuration=file:C:\wildfly-8.0.0.Final(1) \wildfly-8.0.0.Final\domain\configuration/ logging.properties-jar C:\wildfly-8.0.0.Final(1)\wildfly-8.0.0.Final\jboss-modules.jar-mp C:\wildfly-8.0.0.Final(1) \wildfly-8.0.0.Final\modules org.jboss.as.server In the example above, the first line includes a command line that includes a process name ("java") and a path ("C:\Program Files\Java\jdk1.8.0_77\bin\"). As is often the case, the process name is not highly descriptive ("java" being a generic process name that is not uniquely indicative of an application to which it belongs). In the example above, what follows are various process parameters for the java process.

At 204, eligible token words in the one or more parameters are identified. In various embodiments, a set of token words is generated from a block of text (e.g., text comprising the obtained parameters in the example above). In some embodiments, token words are extracted by regarding the block of text as token words separated by specified delimiters (e.g., blank spaces, periods, slashes, numerical values, specific character sequences, etc.) that define boundaries of token words. In the example above, extracted token words include jboss, serverorg, wildfly, as, server, djboss, server, data, djboss, log, and so forth. Examples of delimiters separating token words in the example above include periods, slashes, and hyphens. For example, the token word "wildfly" is seen between the delimiters "\" and "-" (e.g., "\wildfly-"). As another example, the token word jboss is seen between period (".") delimiters (e.g., "Dorg.jboss-.boot"). In various embodiments, token words that appear in a list of ineligible token words are removed to arrive at a list of eligible token words. Oftentimes, these ineligible token words are very common words that have little value in differentiating software processes. For example, "server" in the above list of extracted token words may be removed because it is a very common word that is associated with many software processes.

At 206, the eligible token words are processed to select a subset of the eligible token words that are likely descriptive of the specific process grouping. Examples of processing, described in further detail herein, include normalization, frequency-based filtering, and stemming. For example, in the above example, "Djboss" may be normalized to "djboss" by converting uppercase letters to lowercase. Words that appear frequently in descriptive text associated with other process groupings (e.g., "data", "log", etc.) may be filtered out. Words in plural form, such as "modules", may be stemmed to their singular forms (e.g., "module"). The processing can be regarded as removing noise to arrive at a subset of eligible token words that are more likely to be descriptive of the specific process grouping.

At 208, the selected subset of the eligible token words is utilized to determine a descriptive identifier associated with the specific process grouping. In some embodiments, the descriptive identifier is a combination of the process name and a few eligible token words that appear frequently in the obtained parameters associated with the specific process grouping but appear relatively infrequently in obtained parameters of other process groupings. Stated alternatively, in some embodiments, the descriptive identifier, is the process name with a few differentiating keywords appended. With respect to the above example, the descriptive identifier that is determined may be "java_jboss_wildfly_as". Here, "java" is the process name and "jboss", "wildfly" and "as" are eligible token words ordered by frequency of occurrence in the obtained parameters. In this example, token words are separated by an underscore ("_") character. In various embodiments, the descriptive identifier is a suggested application name for the specific process grouping.

Figure 3:
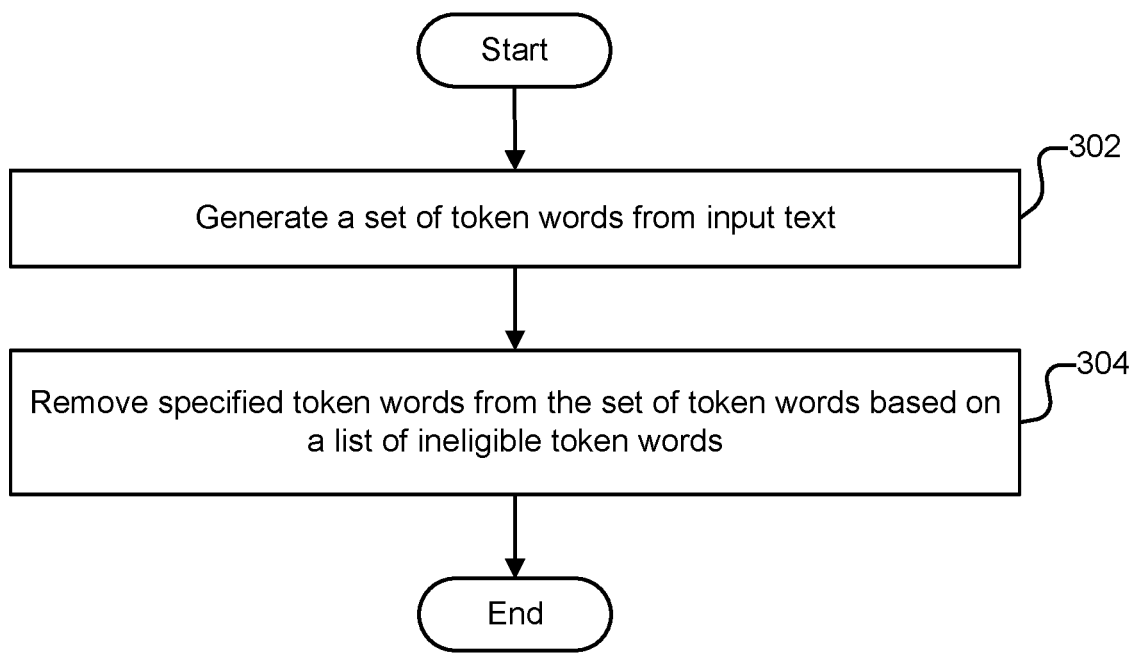
FIG. 3 is a flow chart illustrating an embodiment of a process for identifying eligible token words.

FIG. 3 is a flow chart illustrating an embodiment of a process for identifying eligible token words. In some embodiments, the process of FIG. 3 is performed by descriptive identifier generator 112 of FIG. 1. In some embodiments, at least a portion of the process of FIG. 3 is performed in 204 of FIG. 2.

At 302, a set of token words is generated from input text. In various embodiments, the input text is a block of text that includes descriptive information associated with one or more software processes. Examples of descriptive information in the input text include process command lines, process parameters, process names, and process paths. In various embodiments, the input text includes various text characters, such as punctuation, blank spaces, numbers, and special characters that have little semantic content but surround text strings (e.g., words) in the input text that do have semantic content. In various embodiments, the set of token words is generated based on utilizing such punctuation (e.g., periods, commas, colons, semi-colons, etc.), blank spaces, numbers, and special characters (e.g., slashes, dashes, asterisks, ampersands, etc.) as delimiters to separate instances of token words. Special strings (e.g., "-XX" in the example described with respect to FIG. 2) may also be used as delimiters. In general, delimiters can be customized according to the information content in the input text.

At 304, specified token words are removed from the set of token words based on a list of ineligible token words. The list of ineligible token words is also referred to as a blacklist. In various embodiments, token words in the blacklist are common words that appear frequently in text associated with many software process groupings, thereby rendering these words unhelpful with respect to identifying different process groupings. Stated alternatively, these words have little descriptive value as identifiers of software applications. Examples of token words that may appear in the blacklist include "server", "memory", "daemon", "service", and other common information technology words.

Figure 4:
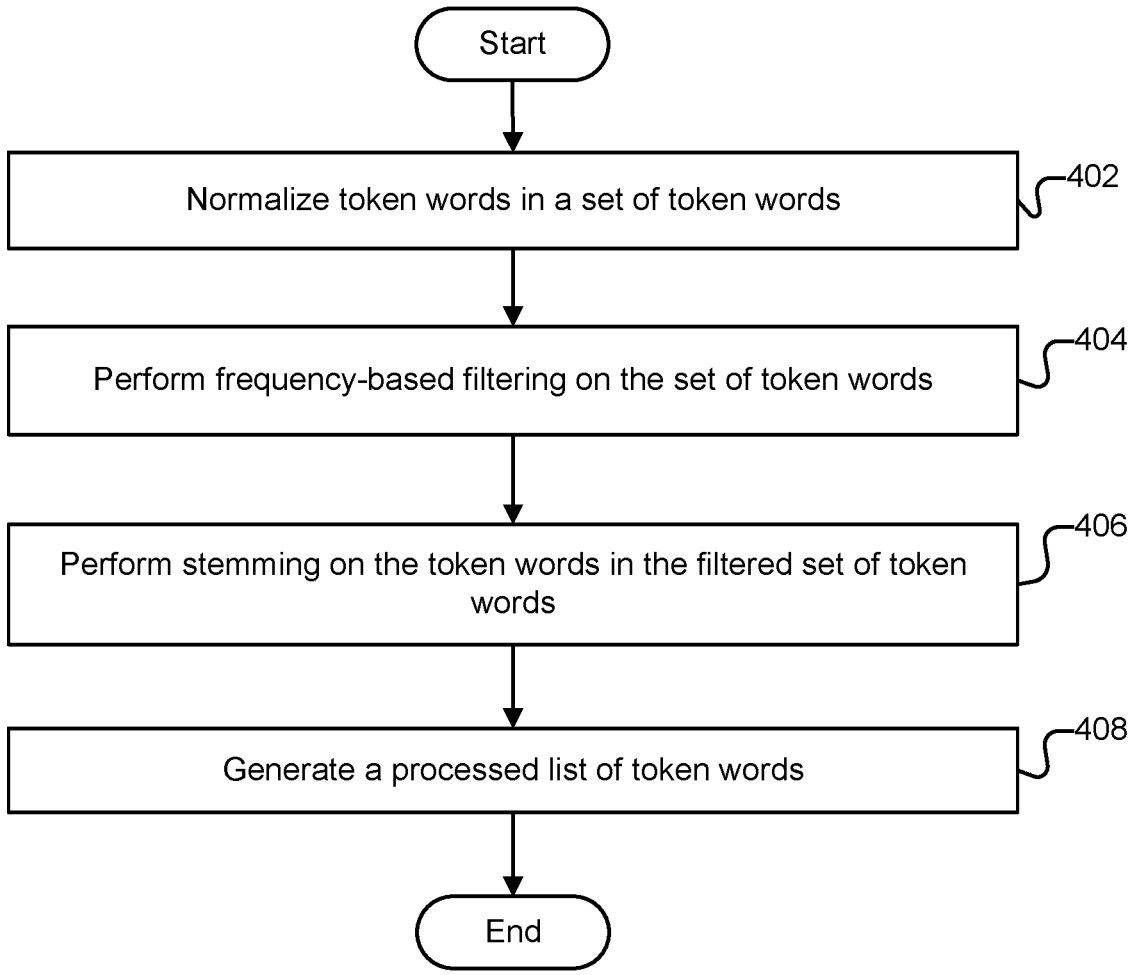
FIG. 4 is a flow chart illustrating an embodiment of a process for processing eligible token words.

FIG. 4 is a flow chart illustrating an embodiment of a process for processing eligible token words. In some embodiments, the process of FIG. 4 is performed by descriptive identifier generator 112 of FIG. 1. In some embodiments, at least a portion of the process of FIG. 4 is performed in 206 of FIG. 2.

At 402, token words in a set of token words are normalized. Examples of normalization include converting any capitalized characters to lowercase, removing numbers, and removing other non-alphabetic characters. Normalization reduces the chance that semantically similar words are not counted together due to minor formatting differences. For example, the words "Wildfly", "wildfly", "wildfly@", and "wildfly1" would all be counted as "wildfly" after normalization.

At 404, frequency-based filtering is performed on the set of token words. As described above, common information technology words (e.g., "server", "memory", "daemon", "service", etc.) may be filtered out based on a blacklist approach. However, different user environments (e.g., different data centers) may have different frequently used words. Thus, oftentimes, a more flexible frequency-based filtering approach is required in addition to the blacklist approach. In various embodiments, a TD-IDF or similar approach is utilized. In various embodiments, for each token word in the set of token words, a term frequency (TD) of the token word in input text associated with a specific process grouping (e.g., process command lines, process parameters, etc.) is calculated. Stated alternatively, a frequency of the token word in a current group is determined. In some embodiments, TD is calculated as the number of times the token word appears in input text associated with the specific process grouping divided by the total number of token words in the input text. Thus, TD is proportional to how often the token word appears in the current group for which a descriptive identifier is sought.

In addition, an inverse document frequency (IDF) of the token word is determined. IDF measures frequency of the token word in input text associated with other process groupings. In some embodiments, IDF is calculated as a logarithm of a quotient, wherein the quotient is the total number of process groupings divided by the number of process groupings whose associated input text includes the token word. Thus, IDF is inversely proportional to how often the token word appears across all groups. For example, if the token word appears in all groups, IDF is equal to $\log(1)=0$. In some embodiments, a TD-IDF score is computed as TD multiplied by IDF. Other formulations for TD and IDF (and thus TD-IDF) are also possible. A common feature across various formulations is that the TD-IDF score increases proportionally to the number of times the token word appears in the current group and is offset by the number of groups in which the token word appears, which deemphasizes token words that appear more frequently in general.

The TD-IDF score for the token word corresponds to how specific the token word is to the current group (e.g., the specific process grouping) and thus how valuable the token word is for distinctly identifying the current group. For example, in the obtained parameters example described with respect to FIG. 2, the token word "domain" appears frequently in the obtained parameters for that specific process grouping. Thus, TD for "domain" would be high. However, "domain", being a common information technology word, probably appears frequently in obtained parameters for other process groupings, meaning IDF for "domain" would be low and would offset the high TD when multiplied with it. The token word "wildfly", on the other hand, appears frequently in the obtained parameters for that specific process grouping and, being an uncommon word, is unlikely to appear frequently in obtained parameters for other process groupings. Thus, TD for "wildfly" would be high and IDF for "wildfly" would not be low, meaning TD-IDF for "wildfly" would be high. In various embodiments, TD-IDF or a similar statistic is applied to each token word to prioritize token words that appear frequently for the process grouping for which a descriptive identifier is being determined but relatively infrequently for other process groupings.

At 406, stemming is performed on the token words in the filtered set of token words. Various examples used herein describe stemming in the English language. It is also possible to apply stemming to words in other languages. In various embodiments, stemming is performed to convert inflected or derived words (e.g., grammatical variants) into their stem/base/root forms. For example, strings such as "transmitted", "transmitting", "transmitter", "transmittal", "transmits", and so forth may be reduced to the stem "transmit". In addition, stemming that is specific to information technology can also be performed to consolidate word tokens that are information technology variants of one another. For example, strings such as "TLSv1", "TLSv2", "TLSver3" may be reduced to the stem "TLS" because "v1", "v2", "ver3", and other variants (indicating a version, e.g., of software) are commonly used in information technology contexts. Stemming may be performed according to a rules-based approach (e.g., by looking up word variants in a dictionary). Stemming may also be performed by applying a machine learning model trained to perform stemming. For example, a convolutional neural network may be trained on token words and their variants.

A benefit of stemming is consolidating token words to more accurately reflect token word frequencies. In some embodiments, word count frequencies and associated statistics of corresponding token words are combined when token words are determined through stemming to belong to a common root form. For example, TF-IDF scores may be combined. It is also possible to perform stemming before performing the frequency-based filtering described above, in which case, no combination of word count frequencies and associated statistics (e.g., TF-IDF scores) is needed.

At 408, a processed list of token words is generated. In various embodiments, a frequency score is associated with each token word in the processed list of token words. For example, in some embodiments, each token word has a corresponding TD-IDF score to reflect how frequently that token word appears in a specific process grouping relative to other process groupings, thereby providing a measure of that token word's value as a descriptive identifier unique to the specific process grouping.

Figure 5:
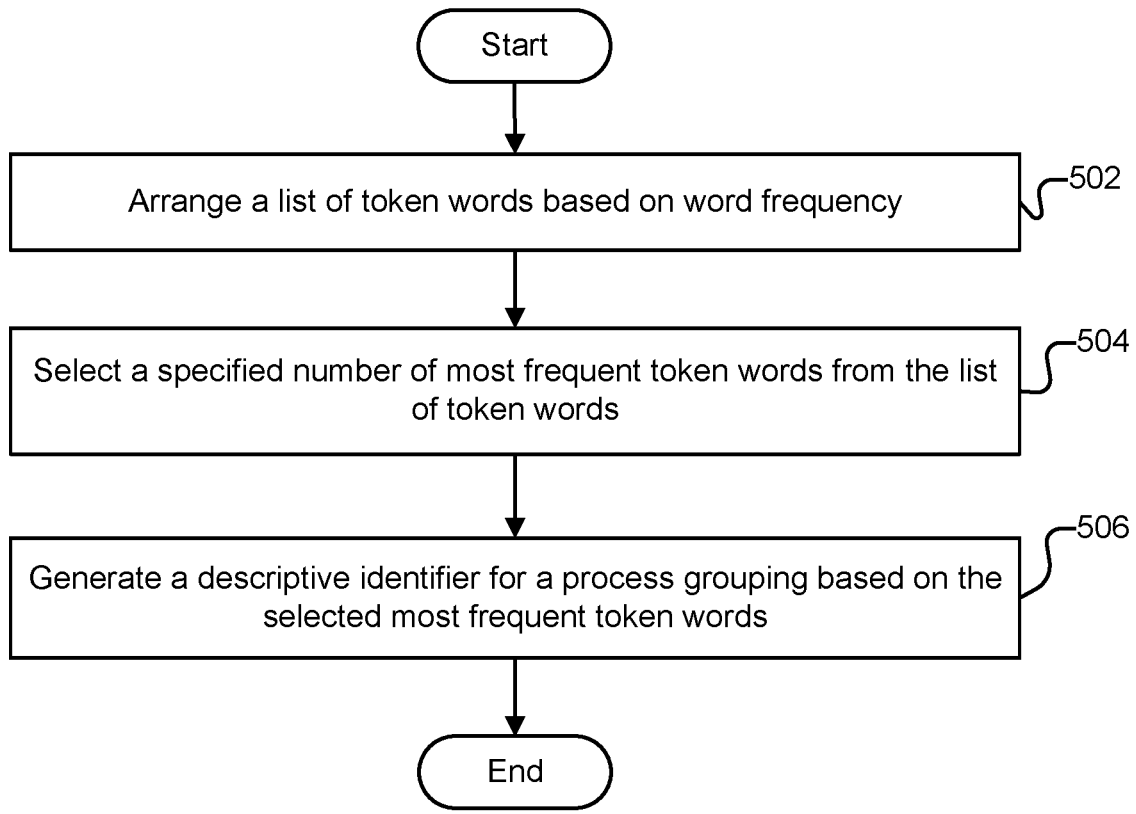
FIG. 5 is a flow chart illustrating an embodiment of a process for utilizing eligible token words to determine a descriptive identifier.

FIG. 5 is a flow chart illustrating an embodiment of a process for utilizing eligible token words to determine a descriptive identifier. In some embodiments, the process of FIG. 5 is performed by descriptive identifier generator 112 of FIG. 1. In some embodiments, at least a portion of the process of FIG. 5 is performed in 208 of FIG. 2.

At 502, a list of token words is arranged based on word frequency. In some embodiments, the list of token words is ordered based on TD-IDF score. It is also possible to order the list of token words based on a simpler frequency metric, such as token word count.

At 504, a specified number of most frequent token words from the list of token words are selected. Typically, the most frequent token words according to word frequency are placed at the top of the list of token words. In some embodiments, the specified number of most frequent token words is a relatively small number (e.g., two to four). In some embodiments, a larger group of most frequent token words is also generated (e.g., top ten token words). The larger group of most frequent token words may be provided to a user so that the user can select a smaller subset of these token words to use in a descriptive identifier for a specific process grouping.

At 506, a descriptive identifier for a process grouping is generated based on the selected most frequent token words. In some embodiments, the descriptive identifier is automatically generated based on the selected most frequent token words. For example, if the selected most frequent token words are "jboss", "wildfly", and "as" in order of frequency and a common process name in the process grouping is "java", then "java_jboss_wildfly_as" may be generated as the descriptive identifier. In various embodiments, the descriptive identifier that is generated is a suggested process grouping name that a user is able to modify. As described above, it is also possible to present a larger number of most frequent token words to a user so that the user can select a subset of token words from which to generate the descriptive identifier. The above example is merely descriptive. It is possible to generate the descriptive identifier using a different number of most frequent token words. For example, using the top most frequent token word, the generated descriptive identifier would be "java_jboss". Using fewer token words for the descriptive identifier can improve readability. However, using fewer token words also increases the likelihood that the descriptive identifier is not unique.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
executing digital clustering to automatically identify a plurality of processes identified as belonging to a specific process grouping among a plurality of process groupings, wherein:
the plurality of processes are grouped into the same specific process grouping based on being a part of a same specific software application that is being executed by electronic circuitry of a computer, a different set of processes is grouped into a different process grouping in the plurality of process groupings based on being a part of another software application;
after identifying the specific process grouping of the plurality of processes, identifying eligible token words in one or more parameters of the plurality of processes;
processing the eligible token words to select a subset within the eligible token words that are likely descriptive of the specific software application, wherein processing the eligible token words includes:
selecting among the eligible token words, at least one eligible token word for inclusion in the subset for the specific process grouping based on a measure of value on the at least one eligible token word being in the eligible token words for the specific process grouping with respect to a number count of other process groupings that includes the at least one eligible token word;
utilizing the selected subset within the eligible token words to automatically determine a plurality of descriptive identifier words describing and differentiating the specific software application among other software applications of the plurality of process groupings; and
using the plurality of descriptive identifier words of the specific software application in automatically discovering and managing the specific software application.

2. The method of claim 1, wherein the one or more parameters include at least one of the following: a command that starts software process execution, a parameter that specifies software process configuration upon execution, a software process name, or a software process file location path.

3. The method of claim 1, wherein the digital clustering includes density-based spatial clustering of applications with noise.

4. The method of claim 1, wherein identifying the eligible token words includes extracting eligible text strings from the one or more parameters.

5. The method of claim 4, wherein extracting the eligible text strings includes identifying sequences of text characters bounded by one or more specified delimiting text characters.

6. The method of claim 1, wherein identifying the eligible token words includes comparing words in the one or more parameters against a list of ineligible token words.

7. The method of claim 1, wherein processing the eligible token words includes performing at least one of the following: converting uppercase characters of the eligible token words to lowercase versions, removing numerical characters from the eligible token words, or removing non-alphabetic characters from the eligible token words.

8. The method of claim 1, wherein processing the eligible token words includes calculating a word frequency metric for each of the eligible token words and using the calculated word frequency metrics to identify at least a portion of the eligible token words as high frequency eligible token words.

9. The method of claim 1, wherein processing the eligible token words includes converting grammatical variants of the eligible token words to corresponding root forms.

10. The method of claim 1, wherein the plurality of descriptive identifier words include a plurality of words in a file system location path.

11. The method of claim 1, wherein the plurality of descriptive identifier words is a combination of a process name associated with the specific process grouping and one or more words within the selected subset.

12. The method of claim 1, further comprising providing a user with an option to modify the determined plurality of descriptive identifier words.

13. The method of claim 1, further comprising storing in a configuration management database (CMDB) the plurality of descriptive identifier words as an identifier of the specific process grouping.

14. A system, comprising:
one or more processors configured to:
execute digital clustering to automatically identify a plurality of processes identified as belonging to a specific process grouping among a plurality of process groupings, wherein:
the plurality of processes are grouped into the same specific process grouping based on belonging to being a part of a same specific software application that is being executed by electronic circuitry of a computer, a different set of processes is grouped into a different process grouping in the plurality of process groupings based on being a part of another software application;
after identifying the specific process grouping of the plurality of processes, identify eligible token words in one or more parameters of the plurality of processes;
process the eligible token words to select a subset within the eligible token words that are likely descriptive of the specific process grouping, wherein the one or more processors are configured to process the eligible token words including by being configured to:
select among the eligible token words, at least one eligible token word for inclusion in the subset for the specific process grouping based on a measure of value on the at least one eligible token word being in the eligible token words for the specific process grouping with respect to a number count of other process groupings that includes the at least one eligible token word;
utilize the selected subset within the eligible token words to automatically determine a plurality of descriptive identifier words describing and differentiating the specific software application among other software applications of the plurality of process groupings; and use the plurality of descriptive identifier words of the specific software application in automatically discovering and managing the specific software application; and
a memory coupled with at least one of the one or more processors and configured to provide the one or more processors with instructions.

15. A computer program product, the computer program product being embodied in a non-transitory computer readable storage medium and comprising computer instructions for:
executing digital clustering to automatically identify a plurality of processes identified as belonging to a specific process grouping among a plurality of process groupings, wherein:
the plurality of processes are grouped into the same specific process grouping based on being a part of a same specific software application that is being executed by electronic circuitry of a computer, a different set of processes is grouped into a different process grouping in the plurality of process groupings based on being a part of another software application;
after identifying the specific process grouping of the plurality of processes, identifying eligible token words in one or more parameters of the plurality of processes;
processing the eligible token words to select a subset within the eligible token words that are likely descriptive of the specific software application, wherein processing the eligible token words includes:
selecting among the eligible token words, at least one eligible token word for inclusion in the subset for the specific process grouping based on a measure of value on the at least one eligible token word being in the eligible token words for the specific process grouping with respect to a number count of other process groupings that includes the at least one eligible token word;
utilizing the selected subset within the eligible token words to automatically determine a plurality of descriptive identifier words describing and differentiating the specific software application among other software applications of the plurality of process groupings; and
using the plurality of descriptive identifier words of the specific software application in automatically discovering and managing the specific software application.

16. The computer program product of claim 15, wherein the one or more parameters include at least one of the following: a command that starts software process execution, a parameter that specifies software process configuration upon execution, a software process name, or a software process file location path.

17. The computer program product of claim 15, wherein the digital clustering includes density-based spatial clustering of applications with noise.

18. The computer program product of claim 15, wherein identifying the eligible token words includes extracting eligible text strings from the one or more parameters.

19. The computer program product of claim 18, wherein extracting the eligible text strings includes identifying sequences of text characters bounded by one or more specified delimiting text characters.

20. The computer program product of claim 15, wherein identifying the eligible token words includes comparing words in the one or more parameters against a list of ineligible token words.

* * * * *